United States Statutory Invention Registration [19]

[11] Reg. Number: H259

Tam et al.

[43] Published: Apr. 7, 1987

[54] COATED CERAMIC BREEDER MATERIALS

[75] Inventors: Shiu-Wing Tam, Downers Grove; Carl E. Johnson, Elk Grove, both of Ill.

[73] Assignee: The United States of America as represented by the United States Department of Energy, Washington, D.C.

[21] Appl. No.: 899,139

[22] Filed: Aug. 22, 1986

[51] Int. Cl.[4] ..... G21B 1/00

[52] U.S. Cl. ..... 376/146; 376/185; 376/411

*Primary Examiner*—Harvey E. Behrend

*Attorney, Agent, or Firm*—Hugh W. Glenn; Robert J. Fisher; Judson R. Hightower

[57] ABSTRACT

A breeder material for use in a breeder blanket of a nuclear reactor is disclosed. The breeder material comprises a core material of lithium containing ceramic particles which has been coated with a neutron multiplier such as Be or BeO, which coating has a higher thermal conductivity than the core material.

5 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COATED CERAMIC BREEDER MATERIALS

CONTRACTUAL ORIGIN OF THE INVENTION

The United States Government has rights in this invention pursuant to Contract No. W-31-109-ENG-38 between the United States Department of Energy and the University of Chicago, the operator of Argonne National Laboratory.

BACKGROUND OF THE INVENTION

The present invention relates to ceramic materials for use in nuclear fusion reactors and more particularly to coated ceramic breeder materials which exhibit high thermal conductivity while concurrently functioning as a neutron multiplier.

Tritium ($H^3$), an isotope of hydrogen, has been suggested as a fuel to produce energy in a thermal nuclear reaction in accordance with the following equation.

$$D+THe^4+n+17.6 \text{ mev.}$$

In this reaction the deuterium nucleus (D) undergoes fusion with a tritium nucleus (T) to produce a helium—4 nucleus and a neutron (n) with the release of energy. This energy may be converted to heat energy through collision with and absorption by heat transfer materials surrounding the reaction vessel. The heat transfer materials provide a through path for heat transfer fluid such as helium and contains a breeder blanket assembly which also acts as a tritium breeder.

In general, fusion reactor breeder materials which have been used in the recovery of tritium from a lithium containing ceramic breeder blanket are $Li_2O$, $\gamma LiAlO_2$, $Li_4SiO_4$ and $Li_2ZrO_4$. Other lithium containing ceramic materials have also been used. Different problems have been observed in the use of these materials such as fracturing or striation of the materials, sometimes resulting in material shifting and rearrangement within the blanket. Such fractures are due primarily to thermal stresses, and reduce the thermal conductivity of the blanket materials and thus the efficiency and temperature distribution of the blanket.

The use of such lithium containing ceramics usually requires a neutron multiplier, such as Be or BeO, which is generally introduced as a dispersion of Be or BeO amongst the lithium containing ceramic materials.

Two shapes or configurations of particles in the breeder blanket for solid breeders have been suggested for fusion applications. They are: (1) pressed and sintered pellets and (2) sphere-pacC (spherical particles). The pressed and sintered technique has been used successfully for preparing $Li_2O$, $Li_4SiO_4$, $\gamma$-$LiAlO_2$, and $Li_2ZrO_3$. Technology in the formation of spherical particles has been developed for fission fuels and can be considered an attractive alternative for use in the fabrication of ceramic tritium breeder materials. A major advantage of the sphere-pac configuration over pressed and sintered materials is the ability of the sphere-pac configuration to significantly reduce the likelihood of fracture due to thermal stresses and increase contact with the container materials for better heat transfer. This results in enhanced mechanical and thermal stabilities of the solid breeder component.

As stated above, lithium containing ceramic breeding materials in sintered pellet (or block) form have been observed to fracture at a relatively low stress level with a subsequent degradation in thermal conductivity. While the sphere-pac configuration provides a solution to the fracture problem, the nature of the spherical particles is such that the thermal conductivity of the material becomes the dominant factor when considering the effectiveness of materials in such a form, primarily because of the limited contact between spheres.

SUMMARY OF THE INVENTION

Therefore an object of the subject invention is improved ceramic breeding materials.

Another object of the subject inventions is a lithium containing ceramic breeding material having a reduced fracture incidence.

A still further object of the subject invention is a lithium containing breeder material having a coating of a material with a higher thermal conductivity than that of the breeder material itself, while also functioning as a neutron multiplier.

These and other objects are attained in accordance with the present invention wherein there is provided a lithium containing ceramic breeder material which is coated with a neutron multiplier such as Beryllium (Be), Beryllium Oxide (BeO), or other material having a higher thermal conductivity than the lithium ceramic material itself. In addition to exhibiting certain thermal conductivity properties as set forth herein, the neutron multiplier must be capable of withstanding the high temperatures (700°-1300° K.) experienced in a breeder blanket of a fusion reactor. State of the art considerations have indicated several possible configurations for the lithium containing ceramic breeders, including a sphere-pac arrangement or sintered pellets or blocks. When one adds a neutron multiplier such as Be or BeO into a sphere-pac bed of lithium containing ceramic breeders, current concepts include mixing the neutron multiplier randomly into the sphere-pac bed in the form of small spheres of a size comparable to that of the lithium ceramic particles. The present invention shows that a sphere-pac bed of breeder particles coated with a neutron multiplier such as Be and BeO has an improved thermal conductivity when compared with that of a bed of uncoated breeder particles randomly mixed with Be or BeO spheres having the same breeder/multiplier composition ratio.

DETAILED DESCRIPTION OF THE PREFERRED EMBODIMENT

Figure 1:
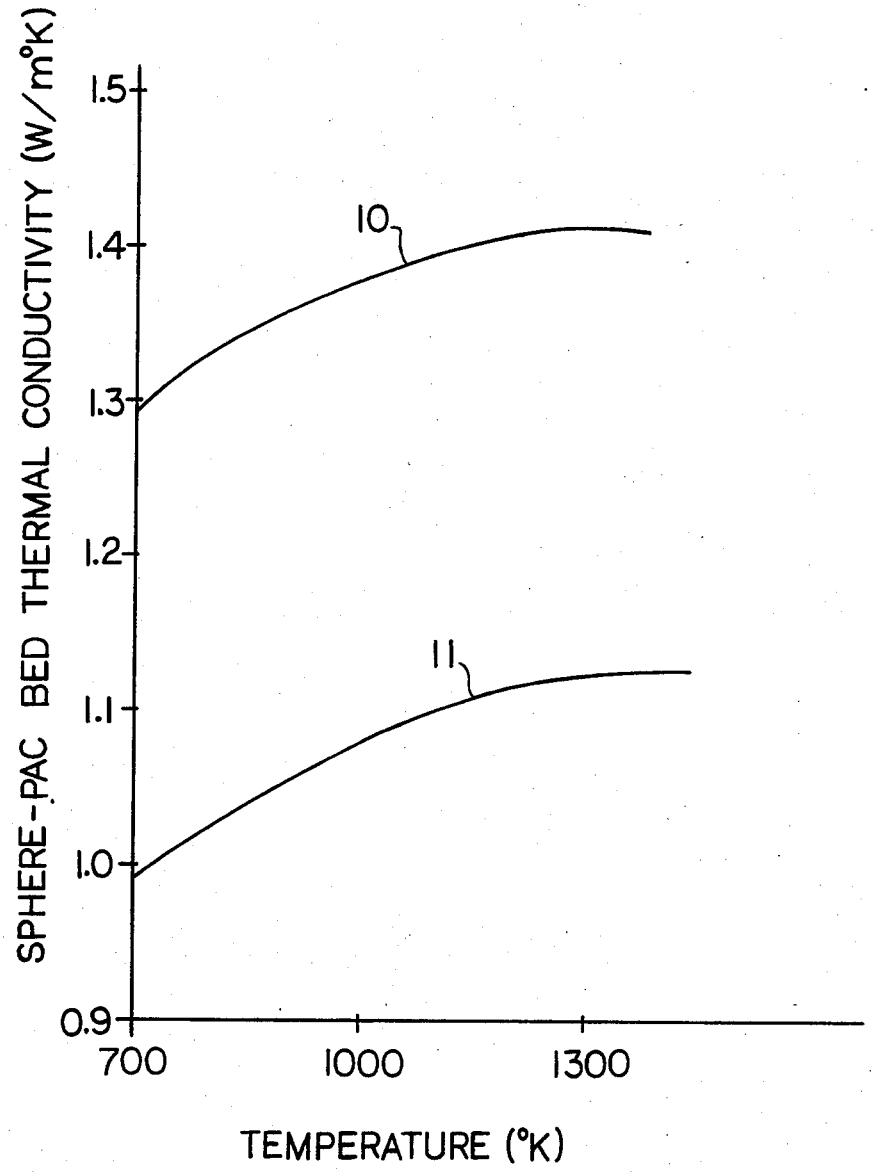
FIG. 1 is a graph showing the thermal conductivity (W/mk) vs. temperature (K.°) of a sphere-pac bed for both a coated sphere-pac bed and uncoated sphere-pac bed.

As stated above, for most solid breeder materials optimum production of tritium requires the addition of a neutron multiplier, such as Beryllium or Beryllium Oxide. In one practice, the neutron multiplier is introduced into the breeder blanket materials as a similarly sized particle and mixed randomly throughout the blanket.

Various manners of the preparation of the starting breeder materials are known. For instance, cold pressing and sintering techniques have been developed for $Li_2O$, $Li2_O$, $Li_4SiO_4$, and $\gamma$-$LiAlO_2$, as reported by L. Yang et al. in "Irradiation Study of Lithium Compound Samples for Tritium Breeding Application." J. Nucl. Mater. 103, 585 (1981), incorporated herein in its entirety. Hot pressing techniques have also been used as a means for controlling impurities, structures and grain size of the breeder material and thereby forming such material into pellets. A discussion of such hot pressing techniques is found in T. Takahasi et al., JAERI—M 7518 (1978) incorporated herein in its entirety. Denser pellets can be obtained using hot pressing methods as opposed to cold pressing and sintering techniques. Up to 99% theoretical density of $Li_2O$ pellets can be achieved with hot isostatic pressing methods, while only 70–93% theoretical density is achieved with cold pressing and sintering techniques.

The preparation of the spherical particles of the lithium containing ceramic breeder material for use in a sphere-pac configuration comprises three major steps: (1) preparation of a sol or special solution ("broth"), (2) gelation of droplets of sol or broth to give semi-rigid spheres, and (3) drying and sintering these spheres to a high density. The sphere-pac configuration requires three sizes of spheres to achieve about 88% theoretical density. These sizes have diametral ratios of about 40:10:1, and the actual diameter sizes currently favored are 1200, 300 and 30 μm. The spnere-pac fuel may be loaded into fuel rods by vibratory compaction.

The blanket materials of the subject invention are lithium containing ceramic breeder materials such as $Li_2O$, $\gamma$-$LiAlO_2$, $Li_4SiO_4$ and $Li_8ZrO_6$ as well as other lithium silicates, zirconates and titanates. These breeder materials are prepared by cold pressing and sintering or by hot pressing as set forth above. In the preferred embodiment of the subject invention, these breeder particles are coated with a neutron multiplier, such as Be or BeO, to provide high thermal conductivity. Several coating procedures may be employed. One such procedure uses a volatile compound of Be, such as found in beryllium hydroxide ($Be(OH)_2$). Then $Be(OH)_2$ is vapor-deposited onto the breeder particle surfaces in a controlled manner via standard vapor deposition techniques known to those skilled in the art. The resulting particles are then calcined to result in a coating component on the breeder particles of BeO. An alternate procedure involves the deposition of a metallic Be coating using a standard plasma spraying technique known to those skilled in the art. The coated ceramic particles are then loaded into a compartment within the containment vessel by vibratory compaction or other suitable manner.

The following example illustrates the concept of sphere-pac bed of coated lithium ceramic particles, and, by detailed computer calculations, validates the claim that significant enhancement of the thermal conductivity would result. For these examples BeO has been used as a neutron-multiplier with $\gamma$-$LiAlO_2$ as the breeder particle. However, similarly enhanced thermal conduction behavior is observed for the coated spheres configuration concept with Be or BeO in combination with other lithium ceramic breeder materials, such as $Li_2O$, $Li_4SiO_4$, $Li_8ZrO_6$, as well as other silicates, zirconates, and titanates.

In addition to coating the breeder materials with a neutron multiplier, as disclosed herein, it should be noted that the thermal conductivity of the breeder bed can be further enhanced by an increase in gas pressure.

Example

For this example, the thermal conductivity of the $\gamma$-$LiAlO_2$/BeO (breeder/multiplier) system in two different configurations is analyzed. The first configuration (coated sphere configuration) represents the subject invention in which the sphere-pac bed comprises $\gamma$-$LiAlO_2$ particles coated with BeO for neutron multiplication. The other configuration (mixed sphere configuration) involves a random mixture of similar-sized $\gamma$-$LiAlO_2$ and BeO particles. For both configurations the computer analysis has utilized the same system parameters including a 1200 μm-diameter for the $\gamma$-$LiAlO_2$ particles and a 20% volume fraction for the BeO component in the breeder materials.

These system parameters are in the typical ranges for fusion application. Such parameters could, of course, be adjusted with no qualitative change in the results discussed below. When compared with the uncoated breeder/multiplier system (i.e., the mixed sphere configuration) the coated sphere configuration exhibits between 20% to 30% increase in thermal conductivity.

The thermal conductivity of coated sphere-pac beds can be calculated as set forth below.

$$\frac{k_{cs}}{k_g} = \frac{\pi}{2(\delta - 1)^2}\left[\delta - 1 - (1 + m)\ln\frac{\delta + m}{1 + m}\right] + 1 - \frac{\pi}{4}$$

Where $m = d_j 2r$ $k_{cs}$ = effective thermoconductivity for coated sphere-pac bed $k_g$ = bulk gas phase thermal conductivity $k_s$ = solid thermal conductivity $\delta = k_g/k_s$ $d_j$ = temperature jump distance for the gas/solid interface r = radius of sphere The thermal conductivity ($k_s$) may be calculated for a coated sphere as follows:

$$k_s = k_c[2k_c + k_i + 2\eta(k_i - k_c)]/[2k_c + k_i - \eta(k_i - k_c)]$$

Where $k_c$ = thermal conductivity of the coated layer $k_i$ = thermal conductivity of the interior component under the coated layer $\eta$ = volume fraction of the interior component The values for $k_{cs}$ from T = 700° K. to 1300° K. under an atmosphere of Helium are plotted as line 10 in the graph of FIG. 1. Literature values were used for the thermal conductivities of $\gamma$-$LiAlO_2$ (G.W. Hollenberg, 84th Annual Meeting of the Amer. Ceram. Soc., Cinn., Ohio, May 3–5, 1982), BeO (Thermophysical Properties of Matter, the TPRC data series, Vol. 2 and 3, Y.S. Touloukian, series editor, C.Y. Ho, series technical editor, IFI/Plenum, New York, Washington, 1970), and He (Thermophysical Properties of Matter, supra). Temperature-jump distances ($d_j$) are taken from Hall and Martin, J. of Nucl. Mat., 101 (1981) 172–83. The values of $d_j$ are not known for He/BeO and He/$\gamma$-$LiAlO_2$. They can be determined with techniques such as those described in Hall and Martin, supra, and Ainscough and Hobbs, Fabrication of Water Reactor Fuel Elements, IAEA, Vienna 1979, p. 23. In the present case, the values of temperature-jump distances were taken from Hall and Martin, supra. The temperature variation of $k_{cs}$ is derived from four sources. They arise from the temperature dependances of the solid components, the gas phase, and that of $d_j$. $d_j$ is also known to be pressure-sensitive.

Should one use a breeder blanket which mixes spheres of different compositions, a modification of the above formula is necessary in order to calculate the thermal conductivity of such a mixture for comparison purposes. The random mixing of the unit cells in a mixed sphere arrangement gives rise to a sphere-pac bed where none of the components are necessarily considered as a continuous medium. In this mixture, there are now two types of unit cells, one a lithium ceramic sphere, such as a $\gamma$-$LiAlO_2$ sphere, surrounded by its own gaseous environment and the other a neutron multiplier sphere, such as a BeO sphere, with its own gas component. The effective individual thermal conductivity of each of these unit cells is calculated via the previous approach. The resultant calculated values for $k_s$ for a breeder bed of mixed spheres is shown as line 11 in FIG. 1.

A comparison of the values shown for $k_{cs}$, line 10 with $k_s$, line 11, at a given temperature shows that in the temperature range of 700°–1300° K., an enhancement of oetween 22–30% of the thermal conductivity of the breeder blanket as a whole is observed with the coated spheres of the subject invention when compared with a mixed sphere blanket. Thus, with the use of coated Lithium containing breeder particles, significantly increased thermal conductivity of the breeder blanket is shown over uncoated particles.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without department from the essential scope thereof. Therefore, it is intended that the invention not be limited to the particular embodiment disclosed as the best mode contemplated for carrying out this invention, but that the invention will include all embodiments falling within the scope of the appended claims.

The embodiments of this invention in which an exclusive property or privilege is claimed are defined as follows:

1. A coated ceramic particle for use in the breeder blankets of nuclear fusion reactors, said particle comprising a core material of a lithium containing ceramic material, said core material having a certain thermal conductivity, said particle having a coating selected from the group consisting of Be and BeO.

2. The coated ceramic particles of claim 1 wherein said coating comprises a neutron multiplier means.

3. The coated ceramic particles of claim 1 wherein said coated particles are of a generally uniform spherical shape.

4. The coated ceramic particle of claim 1 wherein said core material is selected from the group consisting of $Li_2O$, $\gamma$-$LiAlO_2$, $Li_4SiO_4$ and $Li_8ZrO_6$.

5. A coated ceramic breeder particle for use in the breeder blanket of a nuclear fusion reactor, said coated ceramic breeder particle comprising a spherical ceramic particle selected from the group consisting of $Li_2O$, $\gamma$-$LiAlO_2$, $Li_4SiO_4$ and $Li_8ZrO_8$ and having a coating comprising a neutron multiplier means, said coating selected from the group consisting of Be and BeO.

* * * * *